United States Patent Office 3,419,633
Patented Dec. 31, 1968

3,419,633
POLYMERIZATION OF ACYCLIC MONOOLEFINS
Paul R. Stapp, Bartlesville, Okla., assignor to Phillips Petroleum Company, a corporation of Delaware
No Drawing. Filed Feb. 14, 1966, Ser. No. 527,047
5 Claims. (Cl. 260—683.15)

ABSTRACT OF THE DISCLOSURE

Acyclic monoolefins are polymerized to polymers of low molecular weight using a catalyst formed from an alkali metal aluminum hydride and a halide of a Group II metal, preferably in the presence of an inert hydrocarbon diluent.

---

This invention relates to a method and catalyst for polymerizing olefins.

Heretofore, olefins have been polymerized using various catalysts.

It has now been found that acyclic olefins can be polymerized to low molecular weight polymers by using catalysts formed on mixing at least one halide of beryllium, magnesium, calcium, strontium, barium, zinc, cadmium, and mercury with at least one alkali metal aluminum hydride.

Accordingly, the catalyst of this invention is that formed on mixing at least one halide of the above-described Group II metals with at least one alkali metal aluminum hydride.

Accordingly, it is an object of this invention to provide a new and improved method for polymerizing olefins. Another object is to provide a new and improved catalyst.

Other aspects, objects, and the several advantages of this invention will be apparent to those skilled in the art from the description and appended claims.

According to this invention the catalyst is that obtained by mixing at least one chloride, bromide, or iodide, preferably chloride of the above-mentioned Group II metals, preferably magnesium cadmium, barium, and calcium, with at least one alkali metal aluminum hydride wherein the alkali metal is selected from the group consisting of lithium, sodium, potassium, rubidium, and cesium, preferably lithium.

The mixing of the halide component and the alkali metal aluminum hydride component can be carried out in any conventional manner such as by simple dry or liquid blending, stirring, ball milling, and the like, preferably in the presence of a medium substantially inert to the catalyst, reactants, and polymerization products. Suitable mediums include paraffinic, cycloparaffinic, and aromatic hydrocarbons which have from 1 to 12 carbon atoms per molecule, inclusive, and mixtures thereof. The catalytic mixture is preferably pre-formed and then introduced into the reaction but can be prepared in situ in the reaction zone, if desired, by separately adding the halide and hydride components thereto. The mixing time and temperature employed in preparation of the catalytic mixture can vary widely but will generally be from about 1 minute to about 5 days and from about 20° C. or lower to about 300° C., preferably from about 20 to about 100° C. The mole ratio of the halide component to the hydride component can vary widely but will generally be from about 0.1/1 to about 10/1, preferably from about 0.25/1 to about 1/1.

The acyclic monoolefins employed can be terminal or internal, unbranched or branched, and can contain from 2 to 20, preferably 2 to 8, carbon atoms per molecule. Mixtures of olefins can be used. Feedstocks can include ethylene and other 1-olefins and also 1-olefins having branching no nearer than about the 3-position and containing up to about 8 carbon atoms per molecule. Examples of suitable olefins include ethylene, propylene, butene-1, pentene-2, 3-methylbutene-1, 4-methylpentene-2, octene - 4, decene - 1,7,8,9 - trimethyldodecene - 1,5,7-dimethylpentadecene-2, eicosene-1, and the like.

The catalysts of this invention and at least one olefin disclosed are contacted in any conventional contacting apparatus, either in the presence or absence of a diluent, to produce the desired polymeric product. A diluent is generally preferred and any medium which is substantially inert to the catalyst, the feed olefin, and the polymer produced can be employed preferred diluents being those used as the inert medium in the catalyst preparation steps discussed above. Additional diluents which can be employed are ethers having from 2 to 8 carbon atoms per molecule, inclusive, and trialkylamines having from 3 to 12 carbon atoms per molecule, inclusive. Examples of suitable hydrocarbons that can be employed include cyclohexane, benzene, dodecane, and the like and mixtures thereof.

The time of contacting the catalyst and olefin can vary widely but will generally be in the range of from about 15 minutes to about 24 hours, preferably from about 2 to about 8 hours. The reaction pressure can vary widely but will generally be from about 100 to about 5000 p.s.i.g. or higher. The reaction temperature can also vary widely but will be that sufficient to effect polymerization and is preferably in the range of from 125 to about 300° C., preferably from about 175 to about 240° C. The amount of catalyst employed will generally be from about 0.01 to about 10 weight percent based on the olefins present in the reaction zone.

After completion of the reaction, the polymer can be isolated from the reaction mixture by conventional methods such as solvent extraction, distillation, absorption, crystallization, and the like.

The polymer product of this invention, depending upon the specific catalyst, feed, and conditions employed will generally be a liquid product. Frequently, the product will consist essentially of dimers of the feed olefin.

Example I

A catalyst was prepared by stirring 1.91 grams (20 millimoles) of anhydrous magnesium chloride and 1.52 grams (40 millimoles) of lithium aluminum hydride in 100 milliliters of benzene at room temperature for about 16 hours.

The catalyst was transferred, together with an additional 100 milliliters of benzene, to a 1-liter autoclave. The autoclave was pressured to 600 p.s.i.g. with ethylene and maintained at 240° C. for a period of about 4 hours. After cooling to room temperature, the autoclave was vented and 339 grams of liquid product was recovered. The analysis by vapor phase chromatography showed that the product was a mixture of olefins containing up to 18 carbon atoms per molecule.

The same procedure was carried out two more times employing reaction temperatures of 200° C. and 175° C. and similar olefin products were obtained in yields of 187 grams and 31 grams, respectively.

Example II

A catalyst was prepared by stirring 2.54 grams (20 millimoles) of anhydrous barium chloride and 0.76 gram (20 millimoles) of lithium aluminum hydride with 100 milliliters of benzene at room temperature for about 64 hours.

The catalyst was transferred to a 1-liter autoclave together with 100 milliliters of dry benzene and 350 milliliters of 1-hexene. The autoclave was maintained, with stirring, at 250° C. under autogenous pressures for about 5 hours.

After cooling to room temperature, the autoclave was vented and the liquid product recovered and analyzed by vapor phase chromatography. The analysis showed that 2-butyl-1-octene was obtained in a batch yield of 39.8 percent.

Example III

A catalyst was prepared by stirring 3.66 grams (20 millimoles) of anhydrous cadmium chloride and 0.76 gram (20 millimoles) of lithium aluminum hydride together with 100 milliliters of benzene at room temperature for about 16 hours.

The catalyst was transferred to a 1-liter autoclave together with 100 milliliters of benzene and 350 milliliters of 1-hexene. The autoclave was maintained, with stirring, at 250° C. under autogenous pressures for about 5 hours. After cooling to room temperature, the autoclave was vented, the liquid product recovered and analyzed by vapor phase chromatography. The analysis showed a 5 percent batch yield of the dimer product, 2-butyl-1-octene.

Reasonable variations and modifications are possible within the scope of this disclosure without departing from the spirit and scope thereof.

I claim:

1. A method for polymerizing acyclic monoolefins to form polymers of low molecular weight comprising contacting under polymerization conditions ethylene with a catalyst formed on admixing components consisting of (a) the halide of at least one of beryllium, magnesium, calcium, strontium, barium, zinc, cadmium, or mercury and (b) at least one alkali metal aluminum hydride.

2. The method according to claim 1 wherein said halide is magnesium chloride and said hydride is lithium aluminum hydride.

3. A method for polymerizing acyclic monoolefins to form polymers of low molecular weight comprising contacting under polymerization conditions, 1-hexene with a catalyst formed on admixing components consisting of:
   (a) the halide of at least one of beryllium, magnesium, calcium, strontium, barium, zinc, cadmium, or mercury; and
   (b) at least one alkali metal aluminum hydride.

4. The method according to claim 3 wherein said halide is barium chloride and said hydride is lithium aluminum hydride.

5. The method according to claim 3 wherein said contacting is carried out in the presence of a substantially inert diluent and said polymerization condition include a reaction temperature in the range of about 125 to about 300° C., a mol ratio of the halide component to the hydride component is from about 0.1/1 to about 10/1, and an amount of catalyst in the range of about 0.01 to about 10 weight percent based on the amount of olefin to be polymerized.

References Cited

UNITED STATES PATENTS

| | | | |
|---|---|---|---|
| 2,699,457 | 1/1955 | Ziegler et al. | 260—683.15 |
| 2,871,276 | 1/1959 | Eiszner | 260—683.15 |
| 2,935,500 | 5/1960 | Nowlin et al. | 260—94.9 |
| 2,935,542 | 5/1960 | Minckler et al. | 260—683.15 |
| 3,067,189 | 12/1962 | Balas | 260—94.3 |

PAUL M. COUGHLAN, JR., *Primary Examiner.*

U.S. Cl. X.R.

252—441